US006985890B2

(12) United States Patent
Inokuchi

(10) Patent No.: US 6,985,890 B2
(45) Date of Patent: Jan. 10, 2006

(54) GRAPH STRUCTURED DATA PROCESSING METHOD AND SYSTEM, AND PROGRAM THEREFOR

(76) Inventor: Akihiro Inokuchi, 5-5-34-201, Chuo-Rinkan, Yamato-shi, Kanagawa-ken (JP)

( * ) Notice: Subject to any disclaimer, the term of this patent is extended or adjusted under 35 U.S.C. 154(b) by 410 days.

(21) Appl. No.: 10/154,516

(22) Filed: May 23, 2002

(65) Prior Publication Data

US 2003/0225743 A1 Dec. 4, 2003

(51) Int. Cl.
*G06N 5/02* (2006.01)

(52) U.S. Cl. .............................. 706/46; 706/48; 706/12
(58) Field of Classification Search ................ 706/46, 706/48, 12
See application file for complete search history.

(56) References Cited

U.S. PATENT DOCUMENTS

| | | | | |
|---|---|---|---|---|
| 5,991,752 A | * | 11/1999 | Fukuda et al. ................. | 707/1 |
| 6,311,179 B1 | * | 10/2001 | Agarwal et al. ............... | 707/3 |
| 6,317,735 B1 | * | 11/2001 | Morimoto ...................... | 707/2 |
| 6,711,577 B1 | * | 3/2004 | Wong et al. ................. | 707/101 |
| 2002/0174087 A1 | * | 11/2002 | Hao et al. ...................... | 707/1 |

OTHER PUBLICATIONS

Akihiro Inokuchi et al, An Apriori–Based Algorithm for Mning Frequent Substructures from Graph Data, Sep. 13–16, 2000, Springer–Verlag, ISBN: 3–540–41066, 13–23.*

* cited by examiner

*Primary Examiner*—Anthony Knight
*Assistant Examiner*—Joseph P. Hirl
(74) *Attorney, Agent, or Firm*—Richard M. Goldman

(57) ABSTRACT

The efficiency of an AGM algorithm is further improved. For an AGM algorithm that can efficiently extract, from a graph database including graph structured data, graph (frequent graph) data having a support level equal to or greater than the minimum support level, a function "relabel" for ordering the vertex labels and edge labels of the graph is executed (step 1). Further, for a function "Newjoin", for employing a set Fk of adjacency matrixes that represent a size k frequent graph, for generating a set $C_{k+1}$ of adjacency matrixes, which represent a size k+1 candidate frequent graph, a fourth condition for coupling a first generator matrix to a second generator matrix is added to the three conditions of the AGM algorithm only when the first generator matrix is a canonical form.

11 Claims, 8 Drawing Sheets

GRAPH STRUCTURED DATA PROCESSING METHOD AND SYSTEM, AND PROGRAM THEREFOR

BACKGROUND OF THE INVENTION

1. Field of the Invention

The present invention relates to a method and a system for processing data having a graph structure, and a program therefor. The present invention particularly relates to a method and a system that effectively support a technique for efficiently extracting, from a database, a graph having a support level that is equal to or greater than a minimum support level designated by a user, and a program therefor.

2. Related Art

In Japanese Unexamined Patent Publication No. Hei 09-297686, for example, a basket analysis technique is disclosed whereby a regularity present between attributes included in data is extracted from a relational database as an association rule. This technique is used to establish an association between the products that a customer in a retail store loads into a single basket (shopping basket), and is also called a simultaneous purchase analysis. For example, the association rule that a customer who "buys bread and at the same time purchases milk" is expressed using the form "bread→milk". The association rules are used to prepare a marketing strategy.

According to the basket analysis technique, all possible product combinations are enumerated as association rule choices, and actual product purchase databases are searched to establish the validity of combinations. However, the employment of this method would insure that the examination process would have to be performed for some relatively meaningless association rules, including those that would be applicable only to individual customers and that would contribute little or nothing to a marketing strategy discussion. For example, if in a retail store there were 10,000 different types of products, there would be $2^{10000}$ possible product combinations. And since included in these combinations would be meaningless ones such as are described above, evaluating all product combinations would be neither efficient nor practical because of the enormous amount of time that would be required.

According to the technique in the above publication, pruning using a support level and a confidence level as references is performed. Further, an Apriori-based algorithm has been proposed for using the property of a support level to quickly extract frequently appearing product combinations. An example Apriori-based algorithm is described in "First algorithms for mining association rules", R. Agrwal and R. Srikant, in Proceedings of the 20th VLDB Conference, pp. 487–499, 1994 (reference 1). The method described in this publication, reference 1, is used not only in the preparation of supermarket marketing strategies, but also for various other data processes, including those for factory quality control and for the extraction of knowledge from massive libraries of patient charts.

The method described in the above publication, or in reference 1, constitutes a method for quickly extracting sub-sets that frequently appear in multiple sets. However, when multiple sets are provided as multiple graph structures, this method can not be used to extract the sub-structures that frequently appear from multiple graph structures. In such cases, a method is required by which graph patterns can be efficiently extracted from databases having graph structures. An example method is an AGM algorithm (an Apriori-based Graph Mining algorithm) proposed by the present inventor. AGM algorithms are also described in "Application of the Method to Drive Frequent Graphs to Chlorinated Hydrocarbons", Akihiro Inokuchi, Takashi Washio and Hiroshi Motoda, the 39th SIG-FAI, Japanese Society for Artificial Intelligence, 1999. No. 6, pp. 1052–1063, 1994 (reference 2), "Applying Algebraic Mining Method of Graph Substructures to Mutagenesis Data Analysis", A. Inokuchi, T. Washio, T. Okada and H. Motoda, Proc. of International Workshop KDD Challenge on Real-world Data, pp. 41–46, PAKDD-2000 (2000) (reference 3), "An Apriori-Based Algorithm for Mining Frequent Substructures from Graph Data", A. Inokuchi, T. Washio and H. Motoda, Proc. of the 4th European Conference on Principles and Practice of Knowledge Discovery in Databases, pp. 13–20 (2000) (reference 4), or "Fast and Complete Mining Method for Frequent Graph Patterns", Akihiro Inokuchi, Takashi Washio and Hiroshi Motoda, Journal of Japanese Society for Artificial Intelligence, Vol. 15, No. 6, pp. 1052–1063, 1994 (reference 5).

An AGM algorithm can be employed to obtain an association existing between a chemical structure and physiological liveness. For example, in reference 3, when data are provided that describe multiple nitro-organic compounds and mutagen activities, which for cancer is a propagating factor, an association rule that may amplify mutagen activities and an association rule that may suppress it is extracted.

According to the AGM algorithm method, an improvement in efficiency is effected by the early pruning from all other search spaces of a space for which a search is unnecessary. However, AGM algorithms extract frequently appearing graph patterns efficiently only when compared with the method according to which a search of all possible combinations is made, and depending on the support level that is set, the calculation time can be enormous.

SUMMARY OF THE INVENTION

Therefore, one object of the present invention is the further improvement in the efficiency of AGM algorithms. That is, the object of the present invention is the provision of a method whereby frequent graph patterns can be more efficiently extracted from a graph database, while maintaining the complete pruning of unnecessary search spaces.

An overview of the present invention follows. According to the present invention, a graph structured data processing method, for extracting, from a graph database constituting a set of graph structured data, frequent graphs that has a support level equal to or greater than a minimum support level, comprises: a first step of generating, from a set $F_k$ of adjacency matrices of frequent graphs having a size k (k is a natural number), a set $C_{k+1}$ of adjacency matrices $c_{k+1}$ of candidate frequent graphs having a size k+1; a second step of deleting, from the set $C_{k+1}$, the adjacency matrix $c_{k+1}$ of a candidate frequent graph that includes a less frequent graph as an induced subgraph having the size k; a third step of selecting only one adjacency matrix $c'_{k+1}$ from a sub-set of adjacency matrixes $c_{k+1}$ that represent the same graph; and a fourth step of, when the adjacency matrix $c'_{k+1}$ is a frequent graph as the result of scanning of the graph database, adding, to a set $F_{k+1}$ of adjacency matrixes of a frequent graph having the size k+1, the adjacency matrix $c'_{k+1}$ and an adjacency matrix $c_{k+1}$ that represents the same structure as a graph expressed by the adjacency matrix $c'_{k+1}$, wherein, at the first step of generating the adjacency matrix $c_{k+1}$, adjacency matrixes $X_k$ and $Y_k$ of a frequent graph that is a generation base are coupled together by the establishment of a first condition, wherein between the matrixes $X_k$ and $Y_k$ elements other than the k-th row and the k-th column are equal, a second condition, wherein between graphs $G(X_k)$ and $G(Y_k)$, which are represented by the adjacency matrixes $X_k$ and $Y_k$, vertex levels other than the k-th vertex are equal and the order of the level of the k-th vertex of the graph $G(X_k)$ is equal to or lower than the order of the level of the k-th vertex of the graph $G(Y_k)$, a third condition, wherein between the graphs $G(X_k)$ and $G(Y_k)$ the vertex level at the k-th vertex is equal and the code of the adjacency matrix $X_k$ is equal to or smaller than the code of the adjacency matrix $Y_k$, and a fourth condition, wherein the adjacency matrix $X_k$ is a canonical form.

By using this method for processing graph structured data, all frequent graphs having a level equal to or greater than the minimum support level can be effectively extracted from a graph database. Especially when the above fourth condition is added, a calculation can be performed more quickly and require a smaller memory capacity, without losing the completeness of the AGM algorithm of the conventional technique.

The second step includes the steps of: generating, using the adjacency matrices of the candidate frequent graph, adjacency matrices of the induced subgraphs; and normalizing the adjacency matrices of the induced subgraphs. The normalization step includes the steps of: to normalize adjacency matrix $X_k$, determining whether the m in $X_m$ is a natural number and whether m≠k; when the decision is true, converting the adjacency matrix $X_k$ into a canonical form using a transformation matrix $S_m$ for transforming the adjacency matrix $X_m$ into a canonical form, and incrementing the natural number m by one; and when the decision is false, exchanging the (m−1)th row and the (m−1)th column of the adjacency matrix $X_k$ with the m-th row and the m-th column, and decrementing the natural number m by one. In this manner, normalization means can be provided that takes into account the addition of the fourth condition.

In addition to the first to the fourth steps, the graph structured data processing method further comprises the step of: altering the order in which vertex labels or edge labels of the graph structured data are replaced. The vertex labels can be replaced in the ascending order of the average values of the frequencies whereat the vertex labels appear in a transaction. The step of exchanging the edge labels includes the steps of: comparing the average value of frequencies whereat the edge labels appear in the transaction with the average value of appearance frequencies when edges are not present, and assigning a lower order ranking to the label having the smaller average value; and ordering the edge labels in the ascending order of the average values of the frequencies whereat the edge labels appear in a transaction. Once a label replacement has been effected, the labels can be arranged in order to improve the calculation speed. Thus, the calculation efficiency can be improved and a savings in memory can be realized.

The method of the invention can be understood as a system or a program for the invention.

DESCRIPTION OF PREFERRED EMBODIMENTS

Figure 1:
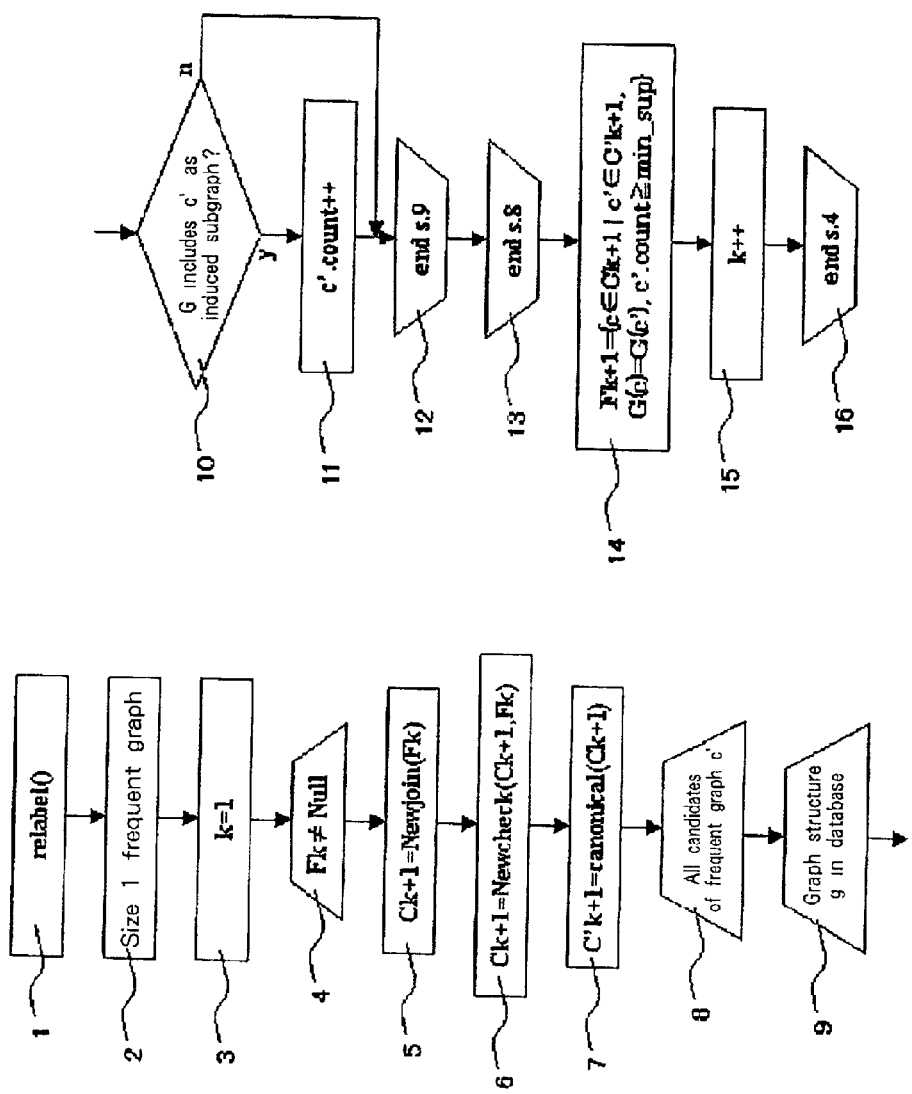
FIG. 1 is a flowchart showing the processing performed by an AGM algorithm according to one embodiment of the invention.

The preferred embodiment of the present invention will now be described in detail while referring to the accompanying drawings. It should be noted, however, that implementation of the present invention is not limited to this embodiment, and that the invention can be implemented in various other modes. The same reference numerals are used throughout the embodiment to denote corresponding or identical components.

1. Definitions

The concept on which the AGM algorithm of this embodiment is based defined as follows.

Definition 1: Labeled Graph

When a set V(G) of vertexes, a set E(G) of edges, a set L(V(G)) of vertex labels and a set L(E(G)) of edge levels are provided as equations 1 to 4, graph G is represented as equation 5.

$V(G) = \{v_1, v_2, \ldots, v_k\}$ [Equation 1]

$E(G) = \{e_h = (v_i, v_j) | v_i, v_j \in V(G)\}$ [Equation 2]

$L(V(G)) = \{lb(v_i) | \forall v_i \in V(G)\}$ [Equation 3]

$L(E(G)) = \{lb_h | \forall e_h \in E(G)\}$ [Equation 4]

$G = (V(G), E(G), L(V(G)), L(E(G)))$ [Equation 5]

In these equations, the number of vertexes, |V(G)|, is defined as the size of the graph G.

Definition 2: Adjacency matrix

The structure of a graph in accordance with definition 1 can be represented using a matrix form. In the specification of the invention, a matrix that represents such a graph is referred to as an adjacency matrix. The vertexes in equation 1 are assigned to the rows and columns of an adjacency matrix, and the edges in equation 2 are assigned to the elements of the matrix. When the graph G in equation 5 is provided, the (i, j) element $x_{ij}$ of an adjacency matrix X is represented by equation 6.

$$x_{i,j} = \begin{cases} num(lb) & \text{if } e_h = (v_i, v_j) \in E(G) \text{ and } lb = lb(e_h) \\ 0 & \text{if } (v_i, v_j) \notin E(G) \end{cases} \quad [\text{Equation 6}]$$

In equation 6, num(lb) is a positive value that is allocated for label lb. The graph structure represented by the adjacency matrix X is defined as G(X).

Definition 3: Inter-Label Order Relationship

When an adjacency matrix of a graph G is defined in accordance with definition 2, the matrix differs depending on the column and the row to which each vertex of the graph is assigned. That is, a graph can be represented by multiple adjacency matrixes, and a graph structure can always be introduced from an adjacency matrix representation. However, in some cases, the same graph structure is represented by multiple adjacency matrixes. Therefore, in order to reduce the number of expressions in a graph using adjacency matrixes, an order relationship as in equation 7 is provided for the labels of the vertexes.

$$lb_i < lb_j \text{ for } i,j=1, 2, \ldots, |L(V(G))| \text{ and } i \neq j \quad \text{[Equation 7]}$$

Further, the adjacency matrix $X_k$ of the graph G satisfies the relationship in equation 8.

$$lb(v_i, v_i \in G(X_k)) \leq lb(v_{i+1}, v_{i+1} \in G(X_k)) \text{ for } i=1, 2, \ldots, k-1 \quad \text{[Equation 8]}$$

It should be noted that the vertex that corresponds to the i-th row (i-th column) of the adjacency matrix is referred to as the i-th vertex.

Definition 4: Code for an Adjacency Matrix

A code for an adjacency matrix is defined in order to reduce the number of the candidate of frequent graphs that will be described later. The code is used to identify the relation of adjacency matrixes, and is expressed by using the element $x_{ij}$ of the adjacency matrix $X_k$. The codes for an undirected graph and a directed graph are defined respectively as equations 9 and 10.

$$code(X_k) = x_{1,2} x_{1,3} x_{2,3} x_{1,4} \ldots, x_{k-2,k} x_{k-1,k} \quad \text{[Equation 9]}$$

$$code(X_k) = x_{1,2} x_{2,1} x_{1,3} x_{3,1} x_{2,3} x_{3,2} \ldots x_{k-1,k} x_{k,k-1} \quad \text{[Equation 10]}$$

Definition 5: Induced Subgraph

When a graph G is given as in equation 5, an induced subgraph $G_s$ of the graph G is defined as equation 11, and satisfies the conditions in equations 12 and 13.

$$G_s = (V(G_s), E(G_s), L(V(G_s)), L(E(G_s))) \quad \text{[Equation 11]}$$

$$V(G_s) \subset V(G), E(G_s) \subset E(G) \quad \text{[Equation 12]}$$

$$\forall u,v \in V(G_s), (u,v) \in E(G_s) \Leftrightarrow (u,v) \in E(G) \quad \text{[Equation 13]}$$

Definition 6: Support Level

The AGM algorithm of this embodiment is an algorithm for efficiently extracting, from a graph structured database GD, all graph structure that are included as an induced subgraph at a frequency equal to or greater than a specific threshold value. Therefore, the support level is defined as an index for determining whether the graph should be extracted from the graph database GD. That is, when a graph G is provided, the support level sup of the graph G is defined as in equation 14.

$$sup(G) = \text{the number of graphs that include } G \text{ as an induced subgraph/the total number of graphs included in } GD \quad \text{[Equation 14]}$$

2. AGM Algorithm for this Embodiment

The AGM algorithm for this embodiment, as well as the Apriori algorithm explained for the background art, extracts only the graph structure having a support level that is equal to or greater than the minimum support level designated by a user. A graph having a support level equal to or greater than the minimum support level is called a frequent graph.

The following properties are employed for the extraction of a frequent graph. That is, the support level of a graph, which includes, as an induced subgraph, a graph having a support level that is less than the minimum support level, does not fall within a range equal to or greater than the minimum support level. This property is apparent from the definition of equation 14. When this property is employed, unnecessary candidate graphs can be deleted at an early stage by using an algorithm that generates candidate of frequent graphs in ascending order, beginning with a frequent graph for which the size is 1.

2.1 Overview of the AGM Algorithm of the Embodiment

The processing is begun with the generation of a size 1 graph, i.e., a graph having a single vertex. Graphs are then generated in numbers equivalent to their vertex labels. Whether a size 1 graph is a frequent graph is determined by referring to the graph database. This determination is performed for each graph, and a set of frequent graphs is generated.

Frequent size 2 graphs, i.e., having one more vertex, are generated from the set of frequent size 1 graphs. As will be described later, an adjacency matrix expression is employed for this candidate generation process, and further, the candidate generation process is performed so as to satisfy four conditions that will be described later. In this specification, an adjacency matrix that corresponds to the candidate of frequent graph generated at this step is referred to as a normal form.

Then, a check is performed to determine whether the induced subgraphs of the candidate of frequent graph are also frequent. A candidate that includes a non-frequent graph as an induced subgraph is deleted at this time. As is described above, since a graph that includes a non-frequent graph as an induced subgraph is not a frequent graph, thereafter, a search (generation of a candidate) based on this graph need not be performed. As a result, when an enormous space is to be searched, it is ensured that a space that need not be searched will be identified, and that all candidates can be extracted merely by searching a part of the total search space. Since all frequent graphs smaller by one than a candidate frequent graph has already been obtained, whether its induced subgraph is a frequent graph may be determined merely by referring to the frequent graph that has already been obtained, and the graph database need not be referred to. It should be noted, however, that since the adjacency matrix of the induced subgraph of the candidate of frequent graph may not be a normal form, the graph must be normalized.

Following this, if the same graph structure is represented by multiple adjacency matrixes of the generated candidate frequent graphs, a matrix having the smallest code is selected. In this specification, the selected matrix is called a canonical form.

Next, the graph database is closely examined for candidate graphs that corresponds to the adjacency matrix which is the canonical form to determine whether a pertinent candidate graph is a frequent graph. If so, this candidate is defined as a frequent graph.

While the size k of the graph is sequentially incremented by one, the above processing is continuously performed until a size k for which a frequent graph is not extracted is reached. By using this algorithm, all frequent graphs can be extracted from the graph database merely by examining a part of the search space.

2.2 Generation of Candidate of Frequent Graphs

As is described above, size k+1 candidate of frequent graphs are generated from the size k frequent graph. The adjacency matrix expression is then employed for the generation process under the following conditions 1 to 4.

Condition 1

Two size k frequent graphs are employed, and their adjacency matrixes are defined as $X_k$ and $Y_k$, as represented by equations 15 and 16.

$$X_k = \begin{bmatrix} X_{k-1} & x_1 \\ x_2^T & x_3 \end{bmatrix} \quad \text{[Equation 15]}$$

$$Y_k = \begin{bmatrix} X_{k-1} & y_1 \\ y_2^T & x_3 \end{bmatrix} \quad \text{[Equation 16]}$$

When all the elements but those in the k-th rows and the k-th columns of the adjacency matrixes $X_k$ and $Y_k$ are equal, i.e., when the structures are the same except for the k-th vertexes of the adjacency matrixes, the matrixes $X_k$ and $Y_k$ are coupled as in equation 17 to generate a matrix $Z_{k+1}$.

$$z_{k+1} = \begin{bmatrix} X_{k-1} & x_1 & y_1 \\ x_2^T & x_3 & z_{k,k+1} \\ y_2^T & z_{k+1,k} & y_3 \end{bmatrix} \quad \text{[Equation 17]}$$

In equation 17, $X_{k-1}$ denotes an adjacency matrix of a size k−1 graph, and $x_1$, $x_2$, $y_1$ and $y_2$ denote vertical vectors of (k−1)×1. $X_k$ and $Y_k$ are called the first generator matrix and the second generator matrix for $Z_{k+1}$.

Condition 2

The relationship represented by equation 18 is established for the vertexes of the generated matrix $Z_{k+1}$.

$lb(v_i; v_i \in V(G(X_k))) = lb(v_1; v_i \in V(G(Y_k)))$  [Equation 18]
$\quad = lb(v_i; v_i \in V(G(Z_{k+1})))$ $lb(v_i; v_i \in V(G(X_k))) \leq lb(v_{i+1}; v_{i+1} \in V(G(X_k)))$ $lb(v_k; v_k \in V(G(X_k))) = lb(v_k; v_k \in V(G(Z_{k+1})))$ $lb(v_k; v_k \in V(G(Y_k))) = lb(v_{k+1}; v_{k+1} \in V(G(Z_{k+1})))$ $lb(v_k; v_k \in V(G(X_k))) \leq lb(v_k; v_k \in V(G(Y_k)))$ $i = 1, 2, \ldots, k-1$ It should be noted that the values of the (k,k+1) element and the (k+1,k) element of the adjacency matrix $Z_{k+1}$ can not be determined from the matrixes $X_k$ and $Y_k$. For an undirected graph, the probable graph structures for $Z_{k+1}$ are those wherein there are edges having labels and wherein there are no edges. Therefore, $|L(E(G))|+1$ adjacency matrixes are generated. This can also be applied for a directed graph.

Condition 3

When between the graph structures $G(X_k)$ and $G(Y_k)$ the label at the k-th vertex is the same, and when the two adjacency matrixes of $Y_k$ and $X_k$ are coupled while they respectively constitute the first and the second generator matrixes, the obtained adjacency matrix is redundant. In order to avoid generation redundancy, the adjacency matrixes are coupled only when the relationship in equation 19 is established.

code(first generator matrix) ≤ code(second generator matrix)  [Equation 19]

Condition 4

The following condition is added to the above conditions 1 to 3. That is, only when the adjacency matrix $X_k$, which is the first generator matrix, has a canonical form, is it coupled with the second generator matrix $Y_k$.

This condition is based on the employment of the following property (Theorem 1).

Theorem 1: "The First Generator Matrix for a Canonical Form is a Canonical Form."

Proof: Assume that a specific canonical form is $X_k$ and its respective first and second generator matrixes are $X_{k-1}$ and $Y_{k-1}$. If the first generator matrix $X_{k-1}$ is not a canonical form, there is an adjacency matrix $X_{c,k-1}$, the structure of which is equal to $G(X_{k-1})$ and the code for which is smaller than code $(X_{k-1})$. At this time, when $Y'_{k-1}$ is an adjacency matrix that satisfies the condition for coupling with the adjacency matrix $X_{c,k-1}$, the code for the adjacency matrix $X'_k$, which is obtained by coupling $X_{c,k-1}$ and $Y'_{k-1}$, is smaller than the code for $X_k$. This is contradicts the fact that $X_k$ is a canonical form.

An adjacency matrix is generated in order to establish the above four conditions. The thus obtained adjacency matrix is a normal form.

2.3 Checking on an Induced Subgraph

A necessary condition wherein the graph structure $G(Z_{k+1})$ of the adjacency matrix obtained by coupling is a frequent graph is that all the induced subgraphs of the graph $G(Z_{k+1})$ are frequent graphs. Therefore, if the adjacency matrixes for the induced subgraphs, which are obtained by removing the i-th vertex ($1 \leq i \leq k-1$) of the graph $G(Z_{k+1})$, represent frequent graphs, pertinent adjacency matrixes are determined to be candidate of frequent graph. Since in accordance with this algorithm only adjacency matrixes which are normal form are generated through the search, so long as an adjacency matrix of the graph from which the i-th vertex has been removed is not a normal form, whether this adjacency matrix is a frequent graph can not be easily determined in accordance with a search performed in the past. Therefore, a method is required for normalizing an adjacency matrix which is a non-normal form. A specific normalization example will be described later.

2.4 Canonical Form

When all candidates of frequent graph have been extracted, the frequency is basically calculated by scanning the database. However, since there are adjacency matrixes in the normal form that represent the same graph, these adjacency matrixes that represent the same graph must be identified. Thus, the canonical form is defined as follows.

Definition 7

In this specification, when a set NF(G) of normal forms that express the graph G is provided, an adjacency matrix $X_c$ in the set NF(G) having the minimum code is called a canonical form. The canonical form $X_c$ is defined as equation 20.

$$X_c = \arg\min_{X \in NF(G)} \text{code}(X) \quad \text{[Equation 20]}$$

When the graph for $X_k$ is equal to the graph for $Y_k$, a matrix $S_k$ is employed for a transformation from $X_k$ to $Y_k$. The element $S_{i,j}$ of $S_k$ is represented by equation 21.

$$S_{i,j} = \begin{cases} 1 & \text{The } i\text{-th vertex of } X_k \text{ corresponds} \\ & \text{to the } j\text{-th vertex of } Y_k \\ 0 & \text{Others} \end{cases} \quad \text{[Equation 21]}$$

Therefore, by using the adjacency matrix $X_k$ and the transformation matrix $S_k$, $Y_k$ is represented as in equation 22.

$Y_k = S_k^T X_k S_k$  [Equation 22]

The superscript "T" represents a transposition matrix.

A method is required for efficiently finding a matrix for the transformation into a canonical form. It is assumed that all adjacency matrixes have matrixes for the transformation into a canonical form, and that, if the canonical form of $X_k$ and a transformation matrix therefor are to be found, all the matrixes for the transformation of a size k−1 frequent graph into a canonical form are already known. The m-th vertex ($1 \leq m \leq k$) of $G(X_k)$ is removed, and its adjacency matrix is normalized. A matrix for the transformation into a normal form is defined as $T^m_{k-1}$, and a matrix for the transformation of the normalized adjacency matrix into the canonical form is defined as $S^m_{k-1}$. Then, the transformation matrix $S^m_k$ of $X_k$ is generated using $S^m_{k-1}$ and $T^m_{k-1}$.

$$S_{i,j} = \begin{cases} S^m_{i,j} & 0 \leq i \leq k-1 \text{ and } 0 \leq j \leq k-1 \\ 1 & i = k \text{ and } j = k \\ 0 & \text{Others} \end{cases} \quad \text{[Equation 23]}$$

$$t_{i,j} = \begin{cases} t^m_{i,j} & i < m \text{ and } j \neq k \\ t^m_{i-1,j} & i > m \text{ and } j \neq k \\ 1 & i = m \text{ and } j = k \\ 0 & \text{Others} \end{cases} \quad \text{[Equation 24]}$$

In this case, $s_{i,j}$, $s''_{i,j}$, $t_{i,j}$ and $t''_{i,j}$ are respective elements of $S^m_k$, $S^m_{k-1}$, $T^m_k$ and $T^m_{k-1}$. The code of the canonical form relative to $X_k$ is provided by equation 25, and the matrix for the transformation into a canonical form is $T^m_k S^m_k$, which minimizes the equations 25.

$$X_{c,k} = \arg \min_{m=1,\ldots,k} \text{code}((T^m_k S^m_k)^T X_k (T^m_k S^m_k)) \quad \text{[Equation 25]}$$

However, if adjacency matrix $(T^m_k S^m_k)^T X_k (T^m_k S^m_k)$, for which the matrix $S'_k$ for the transformation into a canonical form is already known, is found during the calculation of the above equation, the canonical form of $X_k$ is provided by equation 26, and calculations are not required for all elements m.

$$S'^T_k (T^m_k S^m_k)^T X_k (T^m_k S^m_k) S'_k \quad \text{[Equation 26]}$$

It should be noted, however, that the canonical form may not be found using the above method. In this case, the permutations of the vertexes are obtained, and the canonical form and its transformation matrix are searched for in accordance with the permutations.

2.5 Sequential Relationship of Labels

In definition 3, the provision of the sequential relationship for labels has been explained. However, the number of normal forms that are generated depending on this ordering differs. Assume that two types of vertex labels, A and B, are included in a database, and that only the graph structure expressed by the adjacency matrix represented by equation 27 is not a frequent graph.

$$\begin{pmatrix} A & & \\ A & 0 & \\ A & & 0 \end{pmatrix} \quad \text{[Equation 27]}$$

When the sequential relationship of the vertex labels is A<B, there are 17 adjacency matrixes for the normal form having the size of 3. When B<A is established, 18 adjacency matrixes for a size 3 normal form. That is, the number of normal forms differs depending on the ordering of the vertex labels. Since in this case only the size 3 normal form is employed, the difference due to the ordering of the vertex labels is only one matrix. However, for larger adjacency matrixes, the difference is exponentially increased.

In order to reduce the number of normal forms that are generated, the vertex labels should be ordered beginning with one that is frequently included in a non-frequent graph. Therefore, as in equation 28, the sequential relationship is allocated in the ascending order of the average value of the number of labels that are included in the transaction. In equation 28, $\text{avg}(lb_i)$ denotes the average value of the number of labels $lb_i$ that are included in the transaction.

if $\text{avg}(lb_i) < \text{avg}(lb_j)$ then $lb_i < lb_j$ for $i,j=1, \ldots, |L(V(G))|$
and $i \neq j$ [Equation 28]

Similarly, the sequential relationship is allocated for edge labels in the ascending order of the average value of the number of the individual edge labels that are included in the transaction. For a sparse graph, however, more "0s", which indicate there is no edge between vertexes, are present than the edge labels in the adjacency matrixes that represent the respective transactions. Therefore, a function f that returns an integer value equal to or greater than 0 is employed, and the values of the elements of the adjacency matrix are again allocated by equation 29. In equation 29, avg(0) is the average value for the number of 0s that are included in the adjacency matrix that represents the transaction.

if $\text{avg}(lb_i) < \text{avg}(lb_j)$ then $f(lb_i) < f(lb_j)$ [Equation 29]

if $\text{avg}(lb_i) < \text{avg}(0)$ then $f(lb_i) < f(0)$ if $\text{avg}(0) < \text{avg}(lb_j)$ then $f(0) < f(lb_j)$ for i, j = 1, ..., $|L(E(G))|$ and $i \neq j$ Further, the code of the adjacency matrix is represented by equation 30.

$$\text{code}(X_k) = f(x_{1,2}) f(x_{1,3}) f(x_{2,3}) f(x_{1,4}) \ldots f(x_{k-1,k}) \quad \text{[Equation 30]}$$

3. Processing and Pseudo Program Code

Example processing based on the above described algorithm will now be described. FIG. 1 is a flowchart showing example processing using the AGM algorithm according to the embodiment. Further, example pseudo program code for the AGM algorithm is shown below. It should be noted that the numerals in parentheses to the left of the pseudo code are line numbers (this applies hereinafter). The function name of the AGM program is "AGM+". The minimum support level (min_sup) is provided as an argument for the function "AGM+", and a return value is all frequent graphs.

```
(101)   AGM+ (min_sup)
(102)   {
(103)       relabel( );
(104)       F1={size 1 frequent graphs}
(105)       for(k=1;Fk≠Null;k++)
(106)           Ck+1=Newjoin(Fk) ;
(107)           Ck+1=Newcheck(Ck+1,Fk) ;
(108)           C'k+1=canonical(Ck+1) ;
(109)           forall c'∈C'k+1
(110)               forall graph structures g in a database
(111)                   if g includes c' as an induced subgraph
(112)                       c'.count++;
(113)               end
(114)           end
```

```
(115)         end
(116)             Fk+1={c∈Ck+1|c'∈C'k+1,G(c)=G(c'),c'.count≧
                  min_sup}
(117)         end
(118)         return ∪k Fk
(119)    }
```

For the function name "AGM+" of the AGM program, the minimum support level (min_sup) is provided as the argument (line number 101), and the return value is all frequent graphs (line number 118). Fk denotes a set of adjacency matrixes that represent the size k frequent graph, and Ck denotes a set of adjacency matrixes that represent a candidate frequent graph. Further, C'k denotes a set of canonical forms that represent a candidate of frequent graph, and c denotes the element of Ck, i.e., an adjacency matrix, and G(c) denotes the graph structure of this adjacency matrix.

The function "relabel" on line (103) is a function for changing the order of the vertex labels and the order of edge labels. The function "Newjoin" on line (106) is a function for coupling adjacency size k matrixes that match the four conditions, and for returning a set of adjacency matrixes that represent the candidate of frequent graph. The function "Newcheck", on line (107), is a function for determining whether the k induced subgraphs included in the size k candidate of frequent graph are frequent graphs, and for transmitting, as a return value, a set of adjacency matrixes that represent the candidate of frequent graph for which all the induced subgraphs are frequent graphs. The function "canonical" on line (108) is a function for returning, from among adjacency matrixes that represent the size k candidate of frequent graph, an adjacency matrix that is a canonical form.

After the function "relabel" is performed (line number 103, step 1), frequent graphs are extracted in the ascending order of their sizes, beginning with the size 1 frequent graph (line number 104, step 2) (steps 4 to 16, line number 105 to 117). During this process, the actual scanning of the database is performed (line numbers 109 to 115, steps 8 to 13) for candidate of frequent graphs that are present as a result of the performance of the function "Newjoin" (line number 106, step 5), the function "Newcheck" (line number 107, step 6) and the function "canonical" (line number 108, step 7). Then, the frequent graph is actually extracted (line number 118, step 14).

Figure 2:
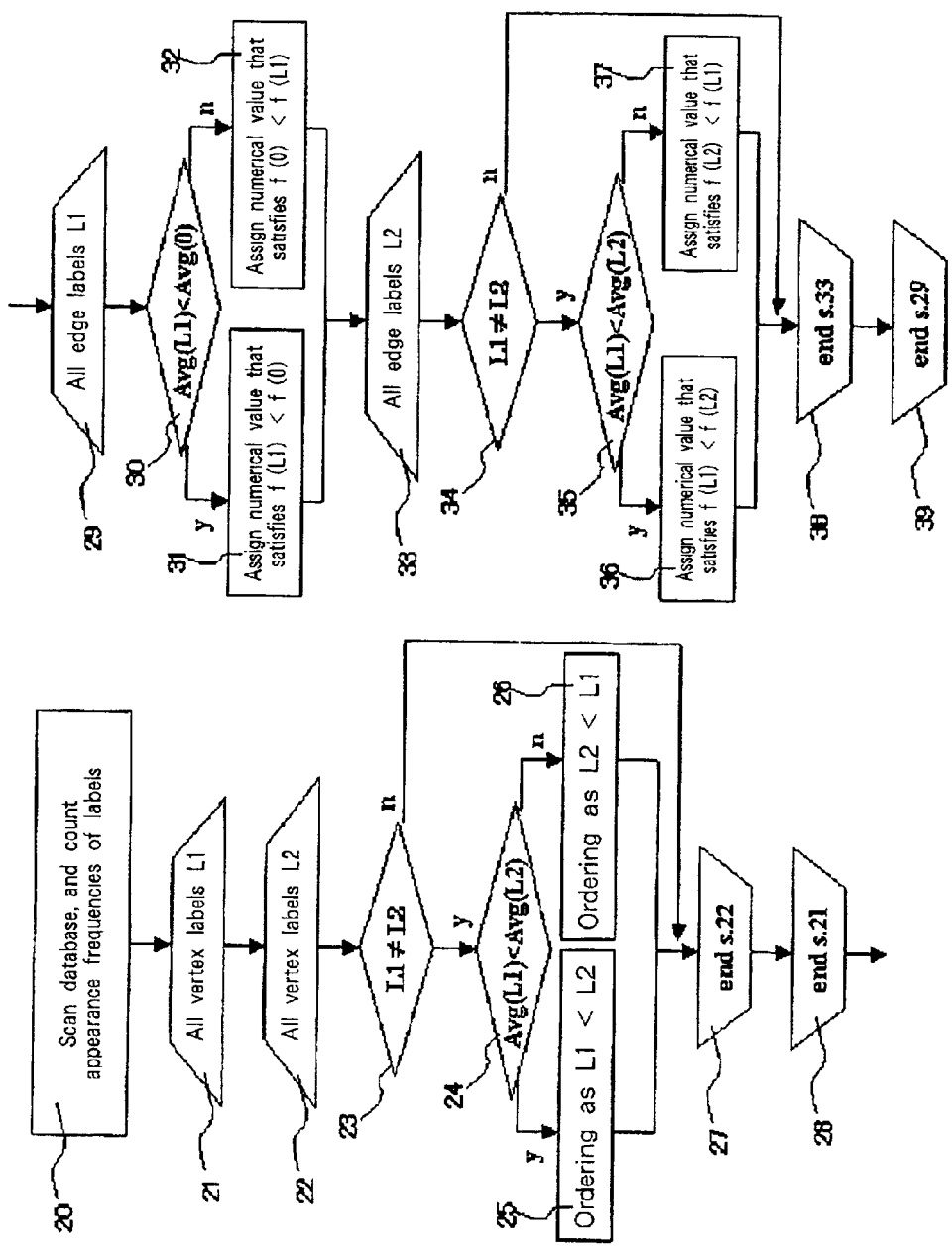
FIG. 2 is a flowchart showing example label ordering processing.

The individual functions will now be described in detail. FIG. 2 is a flowchart showing the label ordering processing.

Example pseudo program code for the function "relabel" is shown below.

```
(201)    relabel( )
(202)    {
(203)        scan a database, and count the appearance
             frequencies of individual labels;
(204)        forall vertex labels L1
(205)            forall vertex labels L2
(206)                if L1≠L2
(207)                    if avg(L)<avg(L2)
(208)                        order labels as L1<L2
(209)                    else
(210)                        order labels as L2<L1
(211)                    end
(212)                end
(213)            end
(214)        end
(215)        forall edge labels L1
(216)            if avg(L1)<avg(0)
(217)                assign a numerical value that satisfies
             f(L1)<f(0)
(218)            else
(219)                assign a numerical value that satisfies
             f(0)<f(L1)
(220)            end
(221)            forall edge labels L2
(222)                if L1≠L2
(223)                    if avg(L1)<avg(L2)
(224)                        assign a numerical value that satisfies
             f(L1)<f(L2)
(225)                    else
(226)                        assign a numerical value that satisfies
             f(L2)<f(L1)
(227)                    end
(228)                end
(229)            end
(230)        end
(231)    }
```

First, the database is scanned, and the appearance frequencies for each vertex label and for each edge label are counted (line number 203, step 20).

Then, the process at steps 21 to 28 is repeated for all vertex labels L1 (line numbers 204 to 214). All vertex labels L2 (line numbers 205 to 213, steps 22 to 27) are then examined to determine whether they differ from the vertex labels L1 (line number 206, step 23). When the vertex labels L2 differ from the vertex labels L1, the average value L2 for the appearance frequencies of the vertex labels L2 is compared with the average value L1 for the appearance frequencies of the vertex labels L1 (line number 207, step 24). When the average value L1 for the vertex labels L1 is smaller than the average value L2 for the vertex labels L2, an ordering is performed wherein L1<L2 (line number 208, step 25). And when the average value L1 is greater than the average value L2, ordering is performed wherein L2<L1 (line number 210, step 26). In this manner, ordering of the vertex labels is performed.

Following this, the process at steps 29 to 39 is repeated for all the edge labels L1 (line numbers 215 to 230). First, the average value L1 for the appearance frequencies of the edge labels L1 is compared with the average value for the appearance frequencies when there are no edges ("0") (line number 216, step 30). When the average value L1 for the appearance frequencies of the edge labels L1 is smaller than the 0 for the average value of the appearance frequencies, a numerical value that satisfies f(L1)<f(0) is assigned (line number 217, step 31). When the average value L1 for the appearance frequencies of the edge labels L1 is greater than the 0 for the average value of the appearance frequencies, a numerical value that satisfies f(L1)>f(0) is assigned (line number 219, step 32). Then, all the edge labels L2 (line numbers 221 to 229, steps 33 to 38) are examined to determine whether they differ from the edge labels L1 (line number 222, step 34). When the edge labels L2 differ from the edge labels L1, the average value L2 for the appearance frequencies L2 is compared with the average value L1 for the appearance frequencies L1 (line number 223, step 35). When the average value L1 is smaller than the average value L2, a numerical value that satisfies f(L1)<f(L2) is assigned (line number 224, step 36). And when the average value L1 is greater than the average value L2, a numerical value that satisfies f(L2)<f(L1) is assigned (line number 226, step 37). As a result, ordering of the edge labels can be performed. It should be noted that the function f is an arbitrary function that returns an integer equal to or greater than 0.

Figure 3:
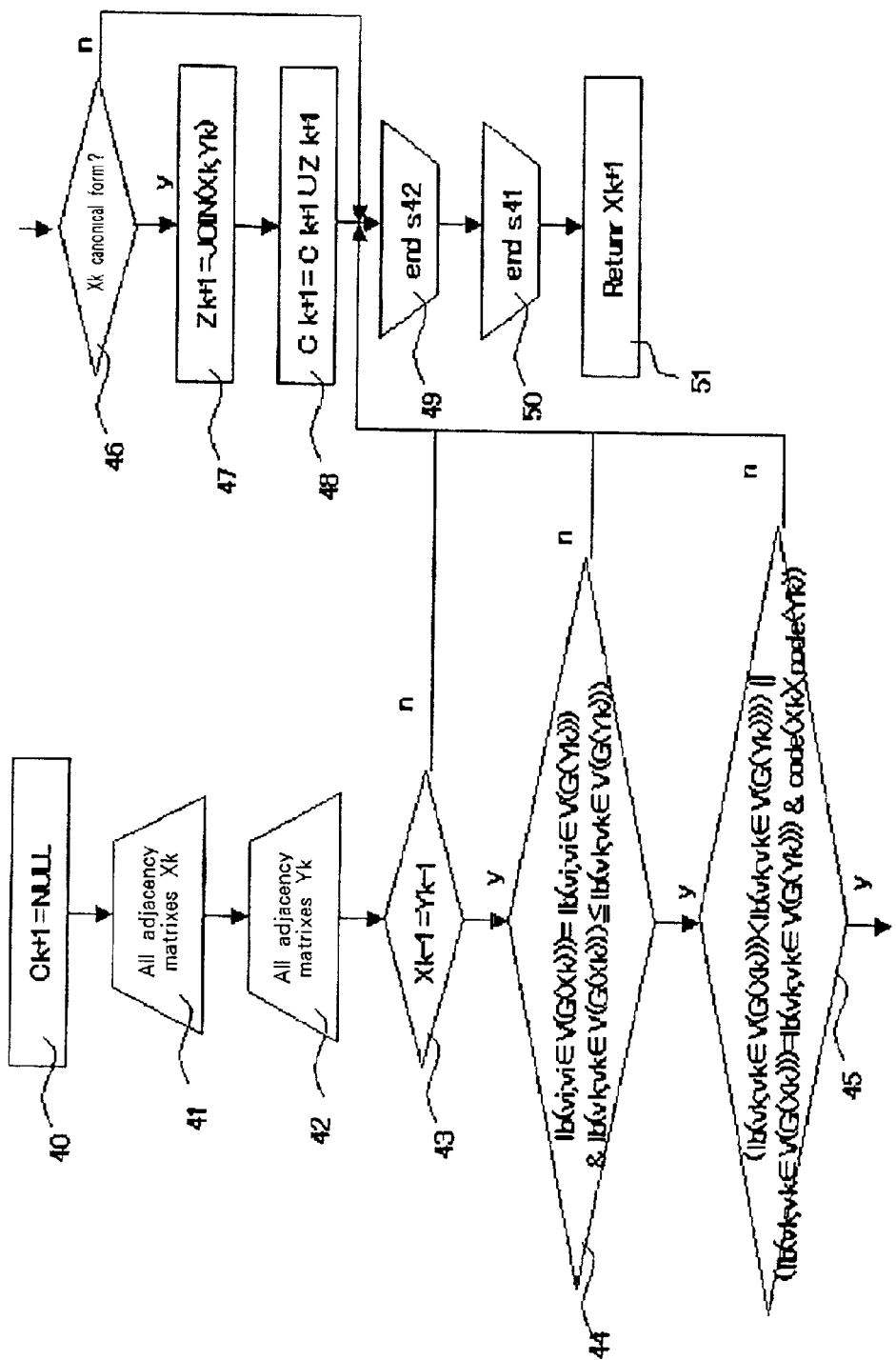
FIG. 3 is a flowchart showing example processing performed using function "Newjoin".

FIG. 3 is a flowchart showing the processing performed for the function "Newjoin". Example pseudo program code for the function "Newjoin" is shown below. The argument is a set of adjacency matrixes that represent a size k frequent graph, and a returned value is a set of adjacency matrixes that represent a size k+1 candidate of frequent graph.

```
(301)    Newjoin(Fk)
(302)    {
(303)        Ck+1=NULL;
(304)        forall Xk∈Fk
(305)            forall Yk∈Fk
(306)                if Xk-1=Yk-1
(307)                    if lb(vi;vi∈V(G(Xk)))=lb(vi;vi∈V(G(Yk)))
(308)                        & lb(vk;vk∈V(G(Xk)))≦lb(vk;
                             vk∈V(G(Yk)))
(309)                        if(lb(vk;vk∈V(G(Xk)))<lb(vk;
                             vk∈V(GYk))))‖
(310)                            (lb(vk;vk∈V(G(Xk)))=
                                 lb(vk;vk∈V(G(Yk)))&
code(Xk)<code(Yk))
(311)                            if Xk is a canonical form
(312)                                Zk+1=JOIN(Xk, Yk);
(313)                                Ck+1=Ck+1 ∪ Zk+1;
(314)                            end
(315)                        end
(316)                    end
(317)                end
(318)            end
(319)        end
(320)        return Ck+1;
(321)    }
```

In the program code for the function "Newjoin", a "forall" command on line (304) is the same as program code that was previously described. Therefore, only the essential portion of the program code of the function "Newjoin" will now be described.

The function "Newjoin" is a function for coupling two size k frequent graphs that match the four conditions, and for returning the obtained graph as candidate of frequent graphs. Xk-1 and Yk-1 represent adjacency matrixes respectively obtained by removing the k-th row and the k-th columns from Xk and Yk. The function "JOIN" generates size k+1 adjacency matrixes by actually coupling the adjacency matrixes Xk and Yk. The if sentence on line (306) corresponds to condition 1 (step 43), and the if sentences on lines (307) and (308) correspond to condition 2 (step 44). The if sentences on lines (309) and (310) correspond to condition 3 (step 45), and the if sentence on line (311) corresponds to condition 4 (step 46). When all these conditions are satisfied, the function "JOIN" is executed (line number 312, step 47), and the results are added to the set Ck+1 (line number 313, step 48).

Figure 4:
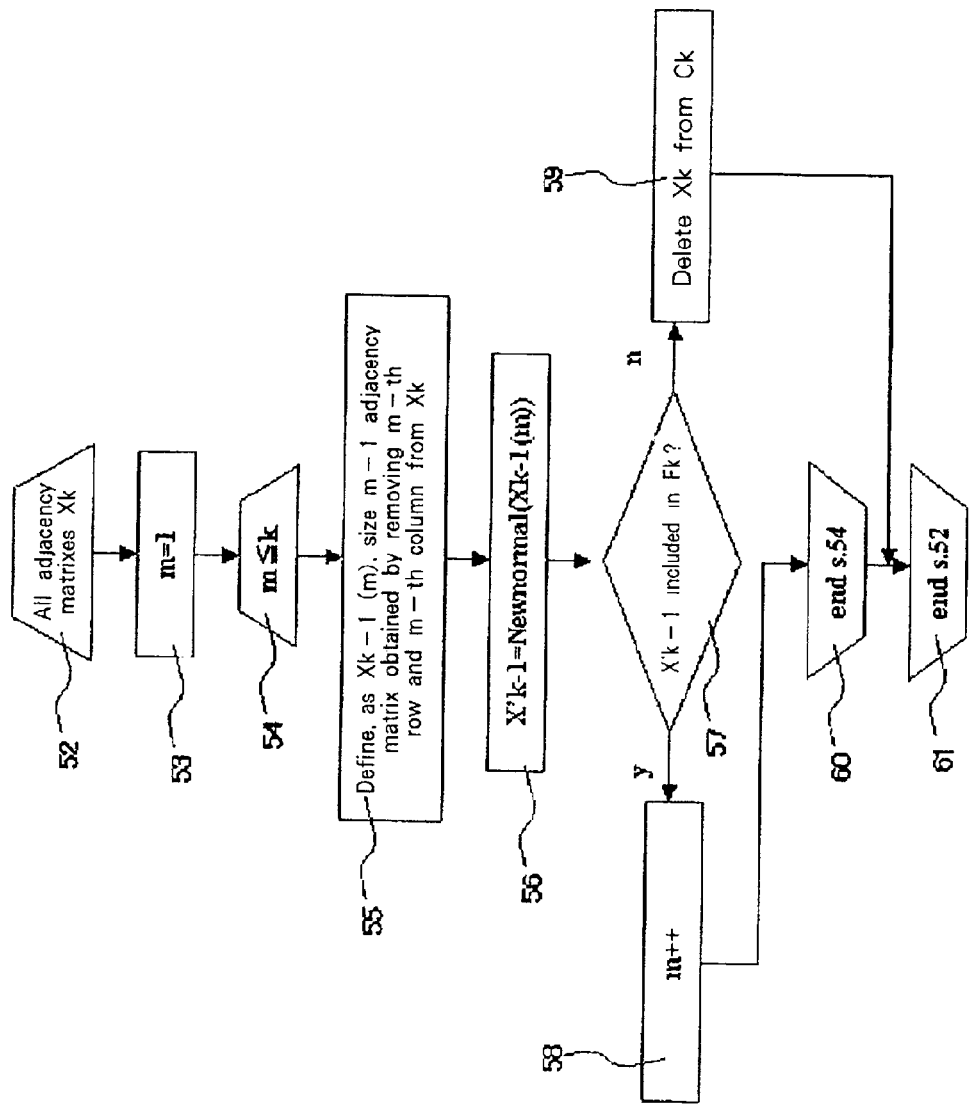
FIG. 4 is a flowchart showing example processing performed using function "Newcheck".

FIG. 4 is a flowchart showing the processing performed for the function "Newcheck". Example pseudo program code for the function "Newcheck" is shown below. The argument for the function "Newcheck" is a set of adjacency matrixes that represent a candidate of frequent graph, and the return value is a set of adjacency matrixes that represent a candidate of frequent graph for which all the induced subgraphs are frequent graphs.

```
(401)    Newcheck(Ck)
(402)    {
(403)        forall Xk∈Ck
(404)            for(m=1;m≦k;m++)
(405)                define, as Xk-1(m), a size m-1 adjacency
```

-continued

```
                3 matrix obtained by removing the m-th row and
                the m-th column from Xk.
(406)                X'k-1=Newnormal(Xk-1(m));
(407)                If X'k-1 is not included in Fk-1.
(408)                    delete Xk from Ck
(409)                    break;
(410)                end
(411)            end
(412)        end
(413)    }
```

The function "check" determines whether k induced subgraphs, which are included in the size k candidate of frequent graph, are frequent graphs. The induced subgraph is a matrix obtained by removing the m-th row and the m-th column from an adjacency matrix, and in this case is defined as Xk-1(m) (line number 405, step 55). Since only adjacency matrixes having a normal form are included in Fk-1, when Xk-1(m) is not a normal form, whether it is an adjacency matrix that represents a frequent graph can not be determined. Therefore, Xk-1(m) is normalized using the function "Newnormal", (line number 406, step 56). If the normalized X'k-1 is not an adjacency matrix that represents a frequent graph, it is assumed that G(Xk) is not a frequent graph, and Xk is deleted from Ck (line numbers 407 and 408, steps 57 to 59).

Figure 5:
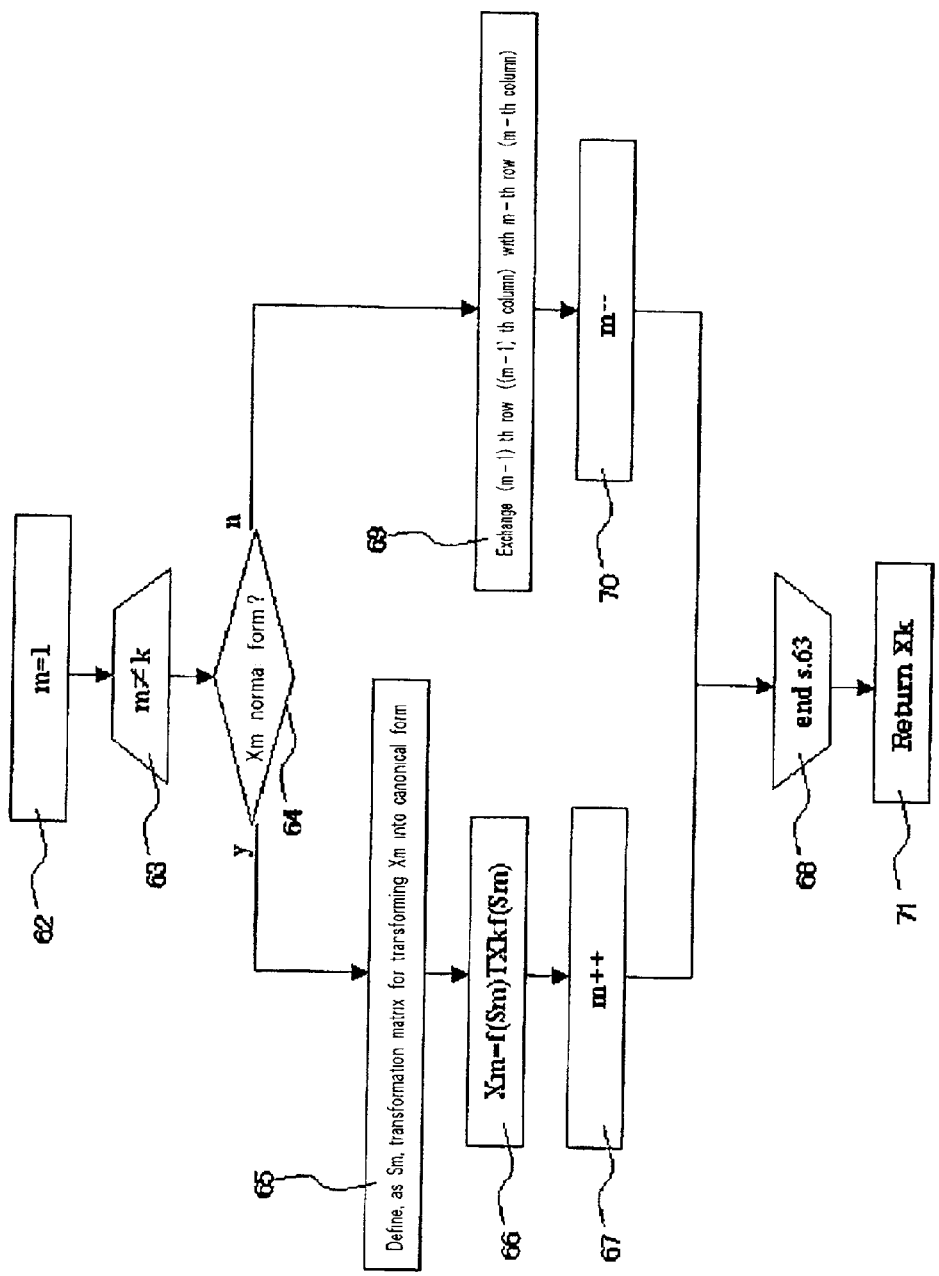
FIG. 5 is a flowchart showing example processing performed using function "Newnormal".

FIG. 5 is a flowchart showing the processing performed for the function "Newnormal". Example pseudo program code for the function "Newnormal" is shown below. The argument for the function "Newnormal" is an adjacency matrix, and the returned value is an adjacency matrix having the normal form that represents the same graph structure as the argument.

```
(501)    Newnormal(Xk)
(502)    {
(503)        m=1;
(504)        while(m≠k)
(505)            if Xm is a normal form
(506)                define, as Sm, a transformation matrix for
                    transforming Xm into a canonical form.
(507)                Xk=f(Sm)TXkf(Sm)
(508)                m++;
(509)            else
(510)                exchange the (m-1)th row (the (m-1)th column)
                    and the m-th row (the m-th column)
(511)                m--;
(512)            end
(513)        end
(514)        return Xk;
(515)    }
```

The function "Newnormal" is a function for normalizing Xk. The normal forms used in this case are adjacency matrixes generated when the four conditions are satisfied. Whether Xm is a normal form is determined (line number 505, step 64), and when it is a normal form, Xk=f(Sm)TXkf(Sm) is obtained when a transformation matrix for transforming Xm into a canonical form is defined as Sm (line numbers 506 and 507, steps 65 and 66). Thereafter, the value held by the counter is incremented by one (line number 508, step 67). It should be noted that f(Sm) is a matrix represented by equation 31, and In is a size n unit matrix.

$$f(S_m) = \begin{pmatrix} S_m & 0 \\ 0 & I_{k-m} \end{pmatrix} \quad [\text{Equation 31}]$$

If Xm is not a normal form, the (m−1)th row (the (m−1)th column) is exchanged with the m-th row (the m-th column) (line number 510, step 69), and the value held by the counter is decremented by one (line number 511, step 70).

Figure 6:
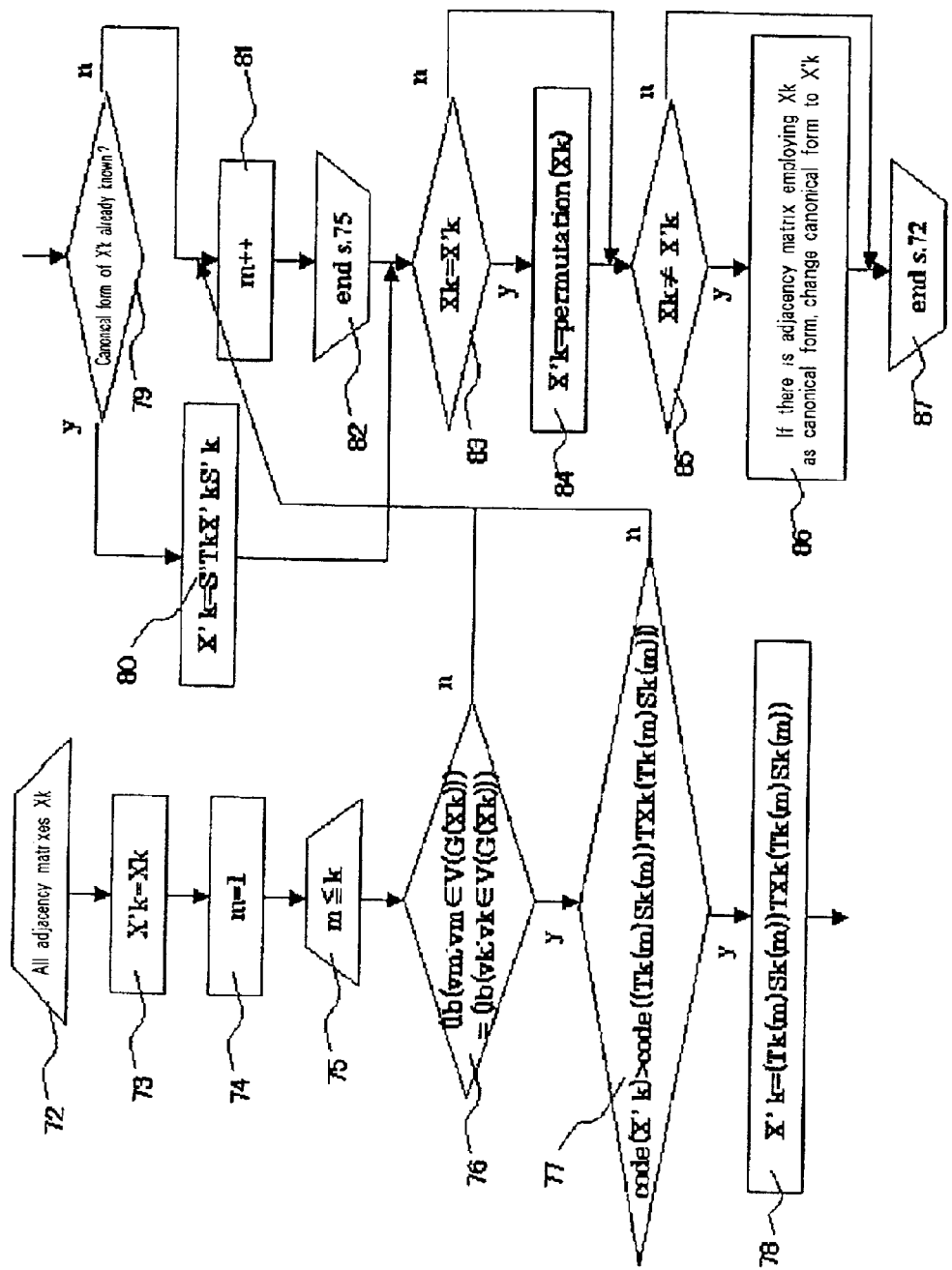
FIG. 6 is a flowchart showing example processing performed using function "canonical".

FIG. 6 is a flowchart showing the processing performed for the function "canonical". Example pseudo program code for the function "canonical" is shown below. The argument for the function "canonical" is a set of adjacency matrixes that represent a candidate of frequent graph, and the returned value is the canonical form of a candidate of frequent graph.

```
(601)  canonical(Ck)
(602)  {
(603)      forall Xk∈Ck
(604)          X'k=Xk;
(605)              for(m=1;m≦k;m++)
(606)                  if(lb(vm;vm∈V(G(Xk)))=(lb(vk;vk∈V(G(Xk)))
(607)                      if(code(X'k)>code((Tk(m)Sk(m))
                              Xk(Tk(m)Sk(m)))
(608)                          X'k=(Tk(m)Sk(m))TXk(Tk(m)Sk(m));
(609)                          if the canonical form of X'k is already
                              known,
(610)                              X'k=S'TkX'kS'k;
(611)                              break;
(612)                          end
(613)                      end
(614)                  end
(615)              end
(616)          if Xk=X'k;
(617)              X'k=permutation(Xk);
(618)          end
(619)          if Xk≠X'k
(620)              if there is an adjacency matrix that employs Xk
                  as a canonical form, change the canonical form to X'k
(621)          end
(622)      end
(623)  }
```

The function "canonical" returns a canonical form from among adjacency matrixes that represent a size k candidate of frequent graph. An adjacency matrix obtained by removing the m-th row and the m-th column from the adjacency matrix Xk is defined as Xk−1(m), the transformation matrix for transforming Xk−1(m) into a normal form is defined as Tk−1(m), and the transformation matrix for transforming the normal form into the canonical form is defined as Sk−1(m). The normalization of Xk−1(m) can be performed by the function Newnormal. The transformation matrixes Tk(m) and Sk(m) are generated from the transformation matrixes Tk−1(m) and Sk−1(m) using the method described in subdivision 2.4. Further, the function "permutation" is a function for obtaining the canonical form using the permutations of the vertexes, and for returning the canonical form of G(Xk).

Through the above processing, graph structured data having a support level equal to or greater than the minimum support level can be efficiently extracted. It should be noted that the function "relabel", for example, is not requisite for the embodiment. In addition, in the process performed for the function "relabel", the ordering either of only the vertex labels or the edge labels is also effective.

4. Specific Application Example

An example wherein the present invention is applied for a chemical structure association will now be described.

While many new compounds composed of many chemical materials have been produced by pharmaceutical companies, only a part of these compounds is actually sold on the market as medicine. This is because some compound materials can be harmful to humans, certain other compound materials discompose during the process beginning at the time they are prescribed and continuing until they reach target portions in human bodies, and still other compound materials are soil contaminates that do not decompose naturally. When a new chemical material is formulated, evaluation experiments must be conducted to examine the toxicity of the material relative to living things, and the accumulation and condensation of the material in components of the natural environment, such as air, water and soil. However, such experiments require extended periods of time and can be extremely expensive, and thus for time and economic reasons, performing experiments to measure toxicity and to acquire relevant data is actually difficult. For example, when animal experiments are employed to measure chronic toxicity, an outlay of at least one hundred million yen and a period of at least one year are required for a single material. Therefore, it would be effective if knowledge (structural active association) could be extracted from the results of experiments that have already been conducted for materials, and if in this fashion the toxicity of a newly formulated chemical material could be predicted. In accordance with advances in the techniques used for genom research, attempts have been made to design medicines using a computer, and the present invention can play an important role in this field.

An example analysis of real data will now be described. For the evaluation experiment conducted for this analysis, a Pentium III 667 MHz (Pentium is a trademark of Intel Corp.) CPU and a personal computer having a memory of 196 MB were used, and as data, mutagen data provided by the international seminar PAKDD2000 Workshop (KDD Challenge 2000) (http://www.slab.dnj.ynu.ac.jp/challenge2000/) was employed. The data included the chemical structure and the numerical attributes of mutagen activities, and consisted of 230 data types. Activities other than the mutagen activities were sorted into four categories, Inactive (activity=−99), Low (−99<activity<0.0), Medium (0.0<activity<3.0) and High (activity>3.0), and were added to individual graphs as vertexes not coupled with the chemical structure. Further, imaginary edges were extended between the vertexes between which the distances were 2 to 6. That is, for a graph, the vertexes of each transaction would carry the labels carbon (C), hydrogen (H), oxygen (O) and activity: none (Inactive), and the edges that are present would carry labels such as single bond, double bond, aromatic bond or distance 2.

Figure 7:
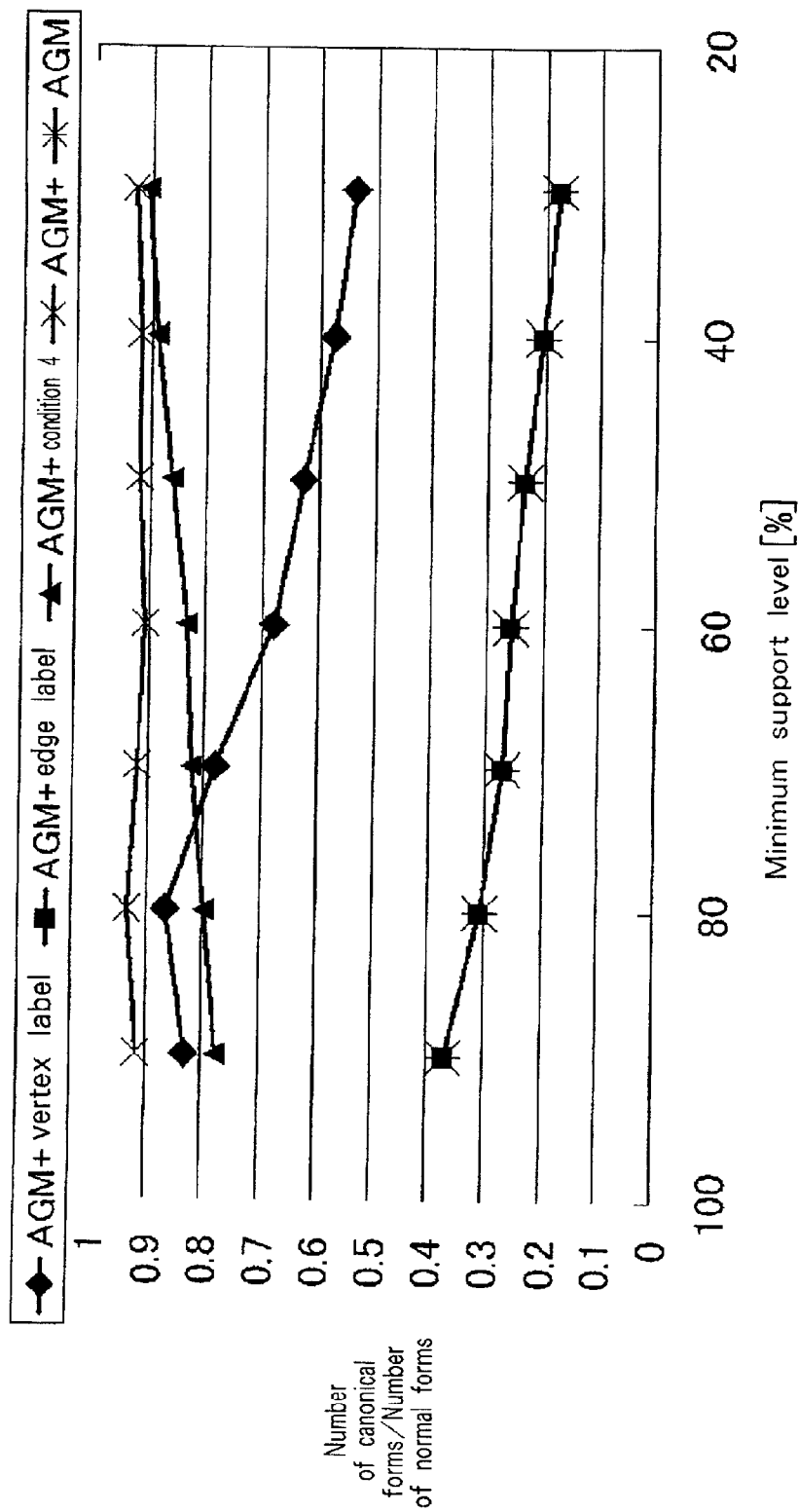
FIG. 7 is a graph showing the ratio of the number of canonical forms to the number of normal forms when the minimum support level is changed.

FIG. 7 is a graph showing the ratio of the number of canonical forms to the number of normal forms when the minimum support level is changed. A ratio that is nearer 1 is more preferable. "AGM" is the AGM algorithm described in reference documents 2 to 5, and "AGM+vertex level" is the result obtained when the vertex labels are ordered and the AGM algorithm is used. "AGM+edge level" is the result obtained when an integer value assigned to an edge level is reassigned and the AGM algorithm is executed. "AGM+condition 4" is the result obtained when condition 4 is added to the AGM algorithm. And "AGM+" is the result obtained when the vertexes and the edges are labeled and the AGM algorithm to which condition 4 has been added (hereinafter referred to as the AGM+ algorithm) is executed. The result obtained by the AGM+ algorithm is near 1, and this means that a redundant normal form is not generated to obtain a canonical form.

Figure 8:
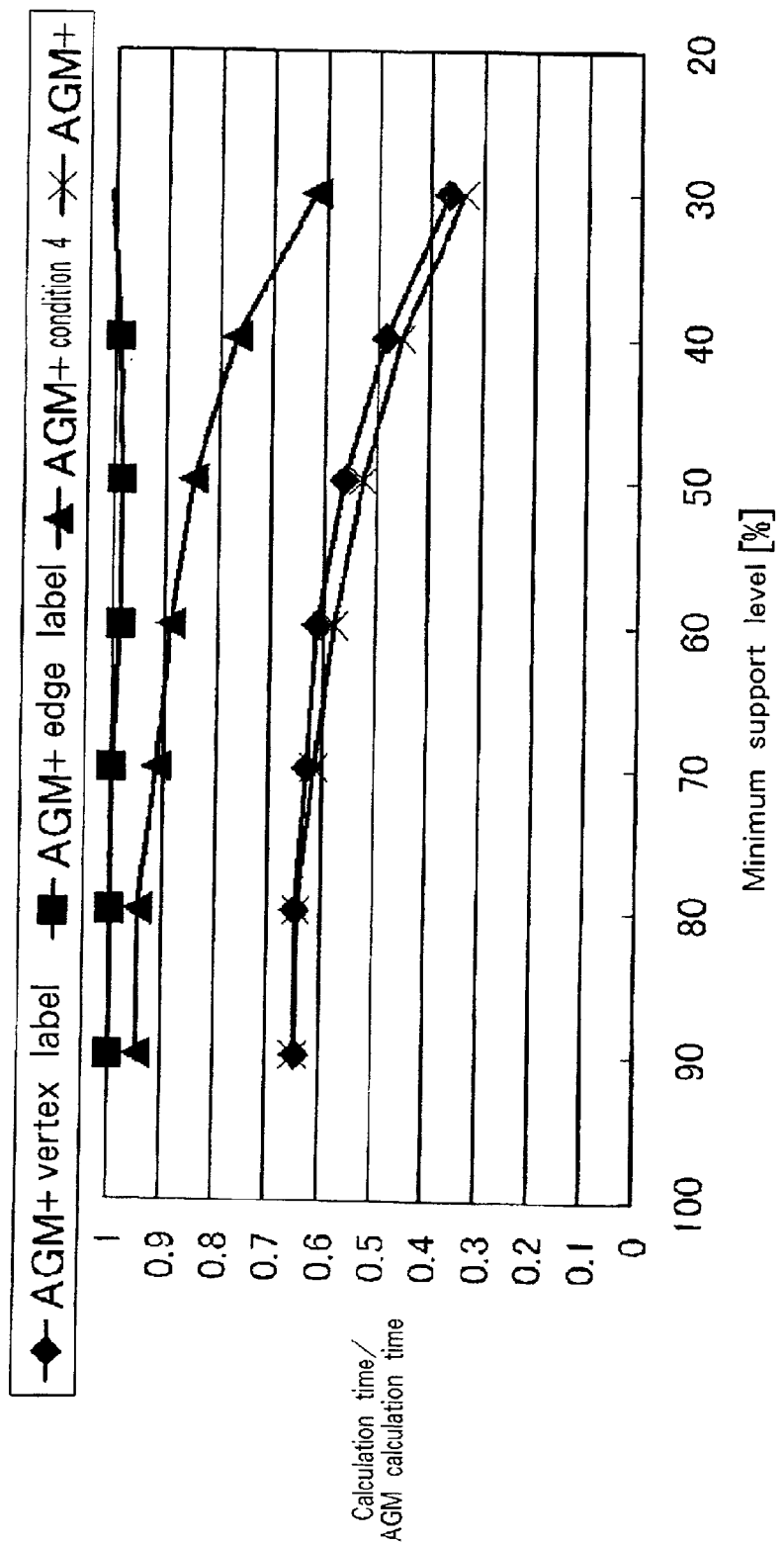
FIG. 8 is a graph showing the ratio of the calculation time required by the AGM+ algorithm to the calculation time required by the AGM algorithm when the minimum support level is changed.

FIG. 8 is a graph showing the ratio of the calculation time required by the AGM algorithm to the calculation time required by the AGM+ algorithm when the minimum support level is changed. It is found that the calculation time required by the AGM+algorithm is 35% to 65% shorter than that required by the AGM algorithm. When the minimum support level is high, "AGM+vertex level" is effective both for the number of normal forms and the calculation time. However, reducing the minimum support level does not provide much of a reduction in the number of normal forms. Although, as for calculation time, "AGM+condition 4" is less effective than "AGM+vertex label", the number of normal forms is unchanged regardless of whether the minimum support level is low or high. Therefore, the effects available with the AGM+ algorithm includes those provided by the ordering of vertex labels for the calculation time, and those provided by condition 4 for the number of normal forms.

The invention proposed by the present inventor has been explained specifically using the embodiment. However, the present invention is not limited to this embodiment, and can be variously modified without departing from the scope of the invention.

The typical effects obtained by the invention are as follows. The efficiency of the AGM algorithm can be increased, and while complete pruning of unnecessary search spaces can be maintained, a frequent graph pattern can be extracted more efficiently from a graph database.

What is claimed is:

1. A graph structured data processing method for extracting a frequent graph that has a support level equal to or greater than a minimum support level, from a graph database constituting a set of graph structured data, said method comprising:

changing the order of vertex labels and edge labels and extracting frequent graphs in order of size;

coupling two size k frequent graphs of size k that match the conditions:

i) between the matrixes $X_k$ and $Y_k$ elements other than the k-th row and the k-th column are equal, ii) between the graphs $G(X_k)$ and $G(Y_k)$ which are represented by adjacency matrixes $X_k$ and $Y_k$, vertex levels other than the k-th vertex are equal and the order of the level of said k-th vertex of said graph $G(X_k)$ is equal to or lower than the order of the level of the k-th vertex of said graph $G(Y_k)$;

iii) between the graphs $G(X_k)$ and $G(Y_k)$ the vertex level at the k-th vertex is equal and the code of said adjacency matrix $X_k$ is equal to or smaller than the code of said adjacency matrix $Y_k$; and iv) said adjacency matrix $X_k$ is a canonical form; and returning a set $F_k$ of adjacency matrixes of a frequent graph having a size k, where k is a natural number, and a set $C_{k+1}$ of adjacency matrixes $c_{k+1}$ of candidate frequent graphs having a size k+1; the obtained graph as candidate of frequent graphs;

when said adjacency matrix $c'_{k+1}$ is a frequent graph as the result of scanning of said graph database, adding, to a set $F_{k+1}$ of adjacency matrixes of a frequent graph having said size $k_{+1}$, said adjacency matrix $c'_{k+1}$ and an adjacency matrix $c_{k+1}$ that represents the same structure as a graph expressed by said adjacency matrix $c'_{k+1}$, obtaining a candidate frequent graph from a set of adjacency matrixes that represent a candidate of frequent graph, where the return value is a set of adjacency matrixes that represent a candidate of frequent graph for which all the induced subgraphs are frequent graphs;

deleting, from said set $C_{k+1}$, said adjacency matrix $c_{k+1}$ of a candidate frequent graph that includes a less frequent graph as an induced subgraph having said size k;

selecting only one adjacency matrix $c'_{k+1}$ from a sub-set of adjacency matrixes $c_{k+1}$ that represent the same graph;

normalizing the candidate frequent matrix and returning a canonical form from among adjacency matrixes that represent a size k candidate of frequent graph; and extracting a frequent graph.

2. The graph structured data processing method according to claim 1, further comprising the steps of: generating, using said adjacency matrixes of said candidate frequent graphs, an adjacency matrix of said induced subgraph;

and normalizing said adjacency matrix of said induced subgraph, and wherein said normalization step includes the steps of: to normalize adjacency matrix $X_k$, determining whether the m in $X_m$ is a natural number and whether m≠k;

when the decision is true, converting said adjacency matrix $X_k$ into a canonical form using a transformation matrix $S_m$ for transforming said adjacency matrix $X_m$ into a canonical form, and incrementing said natural number m by one;

and when the decision is false, exchanging the (m−1)th row and the (m−1)th column of said adjacency matrix $X_k$ with the m-th row and the m-th column, and decrementing said natural number m one.

3. The graph structured data processing method according to claim 1, further comprising, the step of: altering the order in which vertex labels or edge labels of said graph structured data are replaced.

4. The graph structured data processing method according to claim 3, wherein said vertex labels are replaced in the ascending order of the average values of the frequencies whereat said vertex labels appear in a transaction.

5. The graph structured data processing method according to claim 3, wherein said step of exchanging said edge labels includes the steps of: comparing the average value of frequencies whereat said edge labels appear in said transaction with the average value of appearance frequencies when edges are not present, and assigning a lower order ranking to the label having the smaller average value;

and ordering said edge labels in the ascending order of said average values of the frequencies whereat said edge labels appear in a transaction.

6. A graph structured data processing system for extracting a frequent graph that has a support level equal to or greater than a minimum support level, from a graph database constituting a set of graph structured data, said system comprising:

means for changing the order of vertex labels and edge labels and extracting frequent graphs in order of size;

means for coupling two size k frequent graphs of size k that match the conditions:

i) between the matrixes $X_k$ and $Y_k$ elements other than the k-th row and the k-th column are equal, ii) between the graphs $G(X_k)$ and $G(Y_k)$, which are represented by adjacency matrixes $X_k$ and $Y_k$, vertex levels other than the k-th vertex are equal and the order of the level of said k-th vertex of said graph $G(X_k)$ is equal to or lower than the order of the level of the k-th vertex of said graph $G(Y_k)$;

iii) between the graphs $G(X_k)$ and $G(Y_k)$ the vertex level at the k-th vertex is equal and the code of said adjacency matrix $X_k$ is equal to or smaller than the code of said adjacency matrix $Y_k$; and iv) said adjacency matrix $X_k$ is a canonical form; and returning a set $F_k$ of adjacency matrixes of a frequent graph having a size k, where k is a natural number, and a set $C_{k+1}$ of adjacency matrixes $c_{k+1}$ of candidate frequent graphs having a size k+1; the obtained graph as candidate of frequent graphs;

means, when said adjacency matrix $c'_{k+1}$ is a frequent graph as the result of scanning of said graph database, adding, to a set $F_{k+1}$ of adjacency matrixes of a frequent graph having said size $k_{+1}$, said adjacency matrix $c'_{k+1}$ and an adjacency matrix $c_{k+1}$ that represents the same structure as a graph expressed by said adjacency matrix $c'_{k+1}$, obtaining a candidate frequent graph from a set of adjacency matrixes that represent a candidate of frequent graph, where the return value is a set of adjacency matrixes that represent a candidate of frequent graph for which all the induced subgraphs are frequent graphs;

means for deleting, from said set $C_{k+1}$, said adjacency matrix $c_{k+1}$ of a candidate frequent graph that includes a less frequent graph as an induced subgraph having said size k;

means selecting only one adjacency matrix $c'_{k+1}$ from a sub-set of adjacency matrixes $c_{k+1}$ that represent the same graph;

means for normalizing the candidate frequent matrix and returning a canonical form from among adjacency matrixes that represent a size k candidate of frequent graph; and extracting a frequent graph.

7. The graph structured data processing system according to claim 6, wherein said means for deleting, from said set $C_{k+1}$, said adjacency matrix $c_{k+1}$ of a candidate frequent graph further includes: means for generating, using said adjacency matrixes of said candidate frequent graphs, an adjacency matrix of said induced subgraph;

and means for normalizing said adjacency matrix of said induced subgraph, and wherein said normalization means includes: means for, to normalize adjacency matrix $X_k$, determining whether the m in $X_m$ is a natural number and whether m≠k;

means for, when the decision is true, converting said adjacency matrix $X_k$ into a canonical form using a transformation matrix $S_m$ for transforming said adjacency matrix $X_m$ into a canonical form, and for incrementing said natural number m by one;

and means for, when the decision is false, exchanging the (m−1)th row and the (m−1)th column of said adjacency matrix $X_k$ with the m-th row and the m-th column, and for decrementing said natural number m by one.

8. The graph structured data processing system according to claim 6, further comprising: means for altering the order in which vertex labels or edge labels of said graph structured data are replaced.

9. The graph structured data processing system according to claim 8, wherein said vertex labels are replaced in the ascending order of the average values of the frequencies whereat said vertex labels appear in a transaction.

10. The graph structured data processing system according to claim 8, wherein said means for exchanging said edge labels includes: means for comparing the average value of frequencies whereat said edge labels appear in said transaction with the average value of appearance frequencies when edges are not present, and for assigning a lower order ranking to the label having the smaller average value;

and means for ordering said edge labels in the ascending order of said average values of the frequencies whereat said edge labels appear in a transaction.

11. A program, which permits a computer to implement a function for extracting, from a graph database constituting a set of graph structured data, a frequent graph that has a support level equal to or greater than a minimum support level, said program comprising:

program code for changing the order of vertex labels and edge labels and extracting frequent graphs in order of size;

program code for coupling two size k frequent graphs of size k that match the conditions:

i) between the matrixes $X_k$ and $Y_k$ elements other than the k-th row and the k-th column are equal, ii) between the graphs $G(X_k)$ and $G(Y_k)$, which are represented by adjacency matrixes $X_k$ and $Y_k$, vertex levels other than the k-th vertex are equal and the order of the level of said k-th vertex of said graph $G(X_k)$ is equal to or lower than the order of the level of the k-th vertex of said graph $G(Y_k)$;

iii) between the graphs $G(X_k)$ and $G(Y_k)$ the vertex level at the k-th vertex is equal and the code of said adjacency matrix $X_k$ is equal to or smaller than the code of said adjacency matrix $Y_k$; and iv) said adjacency matrix $X_k$ is a canonical form; and returning a set $F_k$ of adjacency matrixes of a frequent graph having a size k, where k is a natural number, and a set $C_{k+1}$ of adjacency matrixes $c_{k+1}$ of candidate frequent graphs having a size k+1; the obtained graph as candidate of frequent graphs;

program code for when said adjacency matrix $c'_{k+1}$ is a frequent graph as the result of scanning of said graph database, adding, to a set $F_{k+1}$ of adjacency matrixes of a frequent graph having said size $k_{+1}$, said adjacency matrix $c'_{k+1}$ and an adjacency matrix $c_{k+1}$ that represents the same structure as a graph expressed by said adjacency matrix $c'_{k+1}$, obtaining a candidate frequent graph from a set of adjacency matrixes that represent a candidate of frequent graph, where the return value is a set of adjacency matrixes that represent a candidate of frequent graph for which all the induced subgraphs are frequent graphs;

program code for deleting, from said set $C_{k+1}$, said adjacency matrix $c_{k+1}$ of a candidate frequent graph that includes a less frequent graph as an induced subgraph having said size k;

program code for selecting only one adjacency matrix $c'_{k+1}$ from a sub-set of adjacency matrixes $c_{k+1}$ that represent the same graph;

program code for normalizing the candidate frequent matrix and returning a canonical form from among adjacency matrixes that represent a size k candidate of frequent graph; and program code for extracting a frequent graph.

* * * * *